(12) United States Patent
Ding et al.

(10) Patent No.: US 8,450,957 B2
(45) Date of Patent: May 28, 2013

(54) SPACE VECTOR BASED SYNCHRONOUS MODULATING METHOD AND SYSTEM

(75) Inventors: Rongjun Ding, Hunan (CN); Jianghong Li, Hunan (CN); Gaohua Chen, Hunan (CN); Wei Xu, Hunan (CN); Huaguo Chen, Hunan (CN)

(73) Assignee: Zhuzhou CSR Times Electric Co., Ltd., Zhuzhou Hunan (CN)

( * ) Notice: Subject to any disclaimer, the term of this patent is extended or adjusted under 35 U.S.C. 154(b) by 233 days.

(21) Appl. No.: 12/997,792

(22) PCT Filed: Feb. 17, 2009

(86) PCT No.: PCT/CN2009/070448
§ 371 (c)(1),
(2), (4) Date: Dec. 13, 2010

(87) PCT Pub. No.: WO2009/149624
PCT Pub. Date: Dec. 17, 2009

(65) Prior Publication Data
US 2011/0110413 A1   May 12, 2011

(30) Foreign Application Priority Data
Jun. 13, 2008  (CN) .......................... 2008 1 0111288

(51) Int. Cl.
*H02P 21/14* (2006.01)
(52) U.S. Cl.
USPC ................. 318/400.02; 318/400.2; 318/700; 363/132; 375/224
(58) Field of Classification Search
USPC ............... 318/400.02, 400.09, 400.29, 599, 318/700, 727, 729, 400.07, 400.2, 400.13, 318/400.33; 363/41, 44, 132; 375/224
See application file for complete search history.

(56) References Cited

U.S. PATENT DOCUMENTS

| 5,706,186 A | * | 1/1998 | Blasko | 363/41 |
| 6,058,028 A | * | 5/2000 | Czerwinski | 363/44 |

(Continued)

FOREIGN PATENT DOCUMENTS

| CN | 1487658 A | 4/2004 |
| CN | 1925314 A | 3/2007 |

(Continued)

OTHER PUBLICATIONS

Haifeng, Lu, et al., "SVPWM Algorithm Based on Modulation Functions," *Transactions of China Electrotechnical Society*, vol. 23, No. 2, pp. 37-43 (Feb. 2008).

(Continued)

*Primary Examiner* — Paul Ip
(74) *Attorney, Agent, or Firm* — Patterson Thuente Pedersen, P.A.

(57) ABSTRACT

A space vector based synchronous modulating method includes sampling a frequency f of a reference voltage vector; checking a relational table of frequencies and carrier wave ratios by the frequency f so as to obtain a carrier wave ratio N; obtaining a passing angle $\Delta\theta$ of the reference voltage vector by $\Delta\theta=2\pi/N$; obtaining a modulating angle $\theta m$ of the reference voltage vector by $\theta m=(Nth-1)\times\Delta\theta$, in which Nth indicates which time of sampling; obtaining a modulating ratio m according to a modulating ratio-frequency curve; accounting and synthesizing an output angle of three basic voltage vectors of the reference voltage vector according to the modulating angle $\theta m$ and the passing angle $\Delta\theta$ of the reference voltage vector and the modulating ratio m; comparing a variable quantity $\theta f$ the reference voltage vector angle $\theta$ and the output angle of three basic voltage vectors, and outputting corresponding basic voltage vectors according to the comparing result; synthesizing an output voltage in accordance with the reference voltage vector by the basic voltage vectors.

12 Claims, 9 Drawing Sheets

U.S. PATENT DOCUMENTS

| | | | |
|---|---|---|---|
| 6,166,930 A * | 12/2000 | Czerwinski | 363/44 |
| 6,388,419 B1 * | 5/2002 | Chen et al. | 318/727 |
| RE38,439 E * | 2/2004 | Czerwinski | 363/44 |
| 6,795,323 B2 * | 9/2004 | Tanaka et al. | 363/41 |
| 7,362,062 B2 | 4/2008 | Schneider et al. | |
| 7,548,443 B2 * | 6/2009 | Arisawa et al. | 363/132 |
| 7,589,984 B2 * | 9/2009 | Salomaki | 363/41 |
| 7,683,568 B2 * | 3/2010 | Pande et al. | 318/729 |
| 7,791,304 B2 * | 9/2010 | Pirozzi et al. | 318/599 |
| 8,129,936 B2 * | 3/2012 | Becker et al. | 318/802 |
| 8,232,753 B2 * | 7/2012 | Shimada et al. | 318/400.09 |
| 2003/0127289 A1 * | 7/2003 | Elgas et al. | 187/224 |
| 2004/0057262 A1 * | 3/2004 | Tanaka et al. | 363/132 |
| 2008/0019157 A1 * | 1/2008 | Salomaki | 363/41 |
| 2008/0169780 A1 * | 7/2008 | Pirozzi et al. | 318/599 |
| 2009/0085510 A1 * | 4/2009 | Pande et al. | 318/729 |
| 2010/0079104 A1 * | 4/2010 | Becker et al. | 318/802 |
| 2011/0062934 A1 * | 3/2011 | Wolf et al. | 323/304 |
| 2011/0074320 A1 * | 3/2011 | Nakamura et al. | 318/400.02 |
| 2011/0080125 A1 * | 4/2011 | Shimada et al. | 318/400.09 |
| 2011/0110413 A1 * | 5/2011 | Ding et al. | 375/224 |
| 2011/0221367 A1 * | 9/2011 | Perisic et al. | 318/400.02 |
| 2012/0161685 A1 * | 6/2012 | Geyer et al. | 318/503 |
| 2012/0169263 A1 * | 7/2012 | Gallegos-Lopez et al. | 318/400.29 |
| 2012/0187876 A1 * | 7/2012 | Perisic et al. | 318/400.02 |

FOREIGN PATENT DOCUMENTS

| | | |
|---|---|---|
| CN | 101009477 A | 8/2007 |
| CN | 101174811 A | 5/2008 |
| CN | 101291130 A | 10/2008 |
| CN | 101330271 A | 12/2008 |
| JP | 64-069266 A | 3/1989 |
| JP | 03-215182 A | 9/1991 |
| JP | 10341600 A | 12/1998 |
| JP | 2004120854 A | 4/2004 |
| JP | 2004350491 A | 12/2004 |
| JP | 2007312598 A | 11/2007 |
| WO | WO 2006/012990 A1 | 2/2006 |

OTHER PUBLICATIONS

Japanese Office Action Cited in Japanese App. No. 2011-512814, Dated Jan. 28, 2013, 9 Pgs.

* cited by examiner

SPACE VECTOR BASED SYNCHRONOUS MODULATING METHOD AND SYSTEM

PRIORITY CLAIM

The present application is a National Phase entry of PCT Application No. PCT/CN2009/070448, filed Feb. 17, 2009, which claims priority to Chinese Patent Application no. 200810111288.4, filed with the Chinese Patent Office on Jun. 13, 2008 and entitled "Space vector synchronous modulation method and system", the disclosures of which are hereby incorporated by reference in their entirety.

FIELD OF THE INVENTION

The present invention relates to the field of vector modulation and in particular to a vector space based synchronous modulation method.

BACKGROUND OF THE INVENTION

An alternating current (AC) drive system refers to a new drive system taking a motor as a control subject in which the speed and the torque of an AC motor is adjusted in a Variable Voltage Variable Frequency (VVVF) mode. The AC drive system is generally composed of a main circuit, a control system and a control subject, i.e., the AC motor. The main circuit includes a direct current (DC) bus, a DC support capacitor and a converter composed of a power semiconductor device. The control system is built on a hardware platform, e.g., a Digital Signal Processor (DSP), a Central Processing Unit (CPU), etc., and with use of a real-time control system on various AC motor control theories of, e.g., sliding difference, field oriented control, direct torque control, etc., it can acquire and process signals, e.g., the speed of the motor, the current of the motor, the voltage of the DC bus, etc., in the drive system, and control the power semiconductor device in the main circuit to be on and off in response to a required speed or torque instruction to adjust the amplitude and the frequency of an AC voltage acting on the motor, thereby controlling the speed and the torque of the motor.

Pulse Width Modulation (PWM) is one of extremely important components in the AC drive control system, which functions to adjust the width of a pulse signal controlling the power semiconductor device of the main circuit to be on and off in response to an input reference voltage and an ongoing voltage of the DC bus to make a fundamental wave voltage output from the main circuit equal to the input reference voltage. PWM can be categorized into asynchronous modulation and synchronous modulation by different modulation ratios, in the former of which the switching frequency of the converter keeps unchanged. With synchronous modulation, the switching frequency of the converter strictly keeps a proportional relationship with the fundamental wave frequency output from the converter so that the switching frequency varies with the fundamental wave frequency. A significant advantage of synchronous modulation over asynchronous modulation lies in not only keeping symmetry of a three-phase AC output from the converter but also attaining Half Wave Symmetry and Quarter Wave Symmetry of a phase voltage to thereby reduce the number of low-order harmonic waves. Synchronous modulation is commonly used in a high speed zone of a high power drive system.

General methods of triangular carrier wave comparison and polygonal trace tracking are currently available to synchronous modulation, the former of which will firstly be introduced below.

In the triangular carrier wave comparison method, a three-phrase modulation wave of the converter is compared with the same triangular carrier wave to output a three-phrase PWM signal, and the ratio of the frequency of the triangular carrier wave to that of the modulation wave keeps unchanged to ensure a strict proportional relationship between the switching frequency of the converter and the fundamental wave frequency output from the converter. In order to address such a disadvantage that the switching frequency is so low in the case of a low frequency that the number of harmonic waves may be increased and so high in the case of a high frequency that it may be difficult for the device to be tolerant, segmented synchronous modulation can be adopted so that a ranges of frequency output from the converter is divided into several frequency bands with a carrier wave ratio which keeps constant in each of the frequency bands but varies from one frequency band to another. Reference is made to FIG. 1 illustrating a schematic diagram of segmented synchronous modulation in the prior art. The slope of a solid line in FIG. 1 represents a carrier waver ratio increasing segment-by-segment as the increasing frequency of the modulation wave, and a dotted line above represents an upper limit of the switching frequency of the converter. $0 \sim f_1$ or $f_2 \sim f_3$ represents a frequency band. Reference is made to Table 1 in which carrier wave ratios of respective frequency bands are listed.

TABLE 1

Carrier wave ratios of respective frequency bands

| Frequency | Carrier wave ratio |
|---|---|
| $0 \sim f_1$ | $N_1$ |
| $f_1 \sim f_2$ | $N_2$ |
| $f_2 \sim f_3$ | $N_3$ |
| ... | ... |

The triangular carrier wave comparison method includes the following steps:

Step 101: The frequency f of the modulation wave is sampled.

Step 102: A carrier wave ratio N corresponding to the frequency in the step 1 is retrieved from Table 1 by using the frequency.

Step 103: A corresponding angle $\Delta\theta = 2\pi/N$ is determined from the carrier wave ratio N.

Step 104: A timing value corresponding to the modulation wave is derived from the angle $\Delta\theta$ as $T = \Delta\theta/\omega = \Delta\theta/2\pi f = 1/Nf$ and transmitted to a first timer.

Step 105: A modulation ratio m is retrieved from a modulation ratio vs. frequency graph in the prior art illustrated in FIG. 2A. The modulation ratio is defined as $m = V_s/V_{dc}$, where $V_{dc}$ represents a voltage at the DC side, and $V_s$ represents the amplitude of a reference voltage vector.

Step 106: The first sine values of U, V and W are retrieved from a sine table.

Step 107: Periods of time during which U, V and W phase switches are on and off are calculated respectively in the formula $$\begin{cases} T_1 = \dfrac{T}{2}(1 + m\sin 2\pi f t_d) \\ T_1' = T - T_1, \end{cases} \quad (1)$$

and the off periods of time are transported to second, third and fourth timers, where m represents the modulation ratio, T represents a control cycle, $T_1$ represents a period of time during which a switch is on, $T_1$ represents a period of time during which a switch is off, f represents the frequency of the modulation wave.

Step 108: An interruption is enabled, a changed-frequency flag is read, and if the frequency has been changed, the flow jumps to the step 102; otherwise, the flow continues with making determination.

In the step of interrupting the first timer, it is determined whether the number of samples reaches N, and if so, the frequency of the modulation wave is sampled, and the frequency is determined whether it has been changed, and if the frequency has been changed, the changed-frequency flag is set. Or if the number of samples does not reach N, subsequent sine values of U, V and W are retrieved from the sine table. Periods of time during which the U, V and W phase switches are on and off are calculated respectively in the formula (1), and the off periods of time are transported to the first, second and third timers.

In the step of interrupting the second, third and fourth timers, the interrupted timers are determined so that the first timer is for the U phase, the second timer is for the V phase and the third timer is for the W phase. It is determined whether the number of samples is odd or even so that a switch signal is output as one if it is odd or zero if it is even. Timing values are updated with the on periods of time.

In the polygonal trace tracking method, when the speed of the motor is not very low, the voltage drop across the resistance of a stator can be neglected, and the vector relationship between the stator voltage $\vec{V}_s$ and the stator magnetic linkage $\vec{\psi}_s$ of the asynchronous motor can be derived as $$\vec{V}_s = \frac{d}{dt}(\psi_s e^{j\omega t}) = \omega\psi_s e^{j(\omega t + \pi/2)}. \tag{2}$$

As can be apparent in the formula (2), $\vec{V}_s$ is proportional to the angular frequency and directionally orthogonal to the stator magnetic linkage $\vec{\psi}_s$ when the amplitude of the $\vec{\psi}_s$ is constant. As a magnetic linkage vector is rotated by 360 degrees in the space, the voltage vector is also moved continuously in the tangential direction of the magnetic linkage circle by $2\pi$ in a trace colliding with the magnetic linkage circle. Thus, the issue of a trace along which the magnetic linkage of the AC motor is rotated can be translated into the issue of a trace along which a voltage space vector is moved. Ideally, it is desirable for the trace of the magnetic linkage to be a circle, but a voltage space vector is limited for the converter of a two-level voltage type, which makes it impossible for the magnetic linkage to be a circle, and consequently a circle has to be replaced with the most approximate polygonal to a circle. Variable polygonal trace tracking will be described below taking a normal dodecagon as an example. Reference is made to FIG. 3 illustrating a normal dodecagon in the polygonal trace tracking method in the prior art. A circle is replaced with the normal dodecagon in which six edges can be generated directly from a non-zero voltage vector and the other six edges have to be generated from synthesis of vectors to result in a polygon with thirty edges. Reference is made to FIG. 4 illustrating a thirty-edge polygonal trace of a magnetic linkage in the polygonal trace tracking method in the prior art. Along with the increasing frequency of the modulation wave, the carrier wave ratio is decremented, and the polygon with thirty edges is converted into a polygon with eighteen edges.

Reference is made to FIG. 5 illustrating an eighteen-edge polygonal trace of a magnetic linkage in the polygonal trace tracking method in the prior art. Finally the polygon is converted into a hexagon to thereby result in a square wave. Specific steps 201 to 205 thereof are identical to the steps 101 to 105 in the triangular carrier wave comparison method and repeated descriptions thereof will be omitted here, and only those subsequent different steps will be introduced.

Step 206: T1, T2 and T0 are calculated in the formula $$\begin{cases} T_1 = \sqrt{3}\, mT\sin(\frac{\pi}{3} - \theta_m) \\ T_2 = \sqrt{3}\, mT\sin(\theta_m) \\ T_0 = T - T_1 - T_2. \end{cases} \tag{3}$$

Step 207: A zero vector is segmented, and acting periods of time of respective minor steps of the vector are determined and transported to a buffer area.

Step 208: The timing value T is transported to the first timer and an interruption is enabled.

Step 209: If the value in the buffer area has been retrieved, the flow goes to the next step; otherwise, the flows waits.

Step 210: If the number of times that calculation has been performed is below N/6, the flow jumps to the step 207; otherwise, the flow goes to the step 201.

In the step of interrupting the first timer, the data in the buffer area is retrieved, and the voltage vector of the first segment is output, and the timing corresponding to the voltage vector of the first segment is transported to the second timer.

In the step of interrupting the second timer, the voltage vector of the next segment is output, and the timing corresponding to the voltage vector of the next segment is transported to the second timer.

In both of the foregoing methods of triangular carrier wave comparison and polygonal trace tracking, calculation is performed with a temporal reference so that firstly the carrier wave ratio N, i.e., the number of samples, is determined from the frequency f, and then the angle $\Delta\theta$ that the samples have undergone is determined from the frequency f and the number of samples N, the period of time T that the samples have undergone is calculated from the undergone angle $\Delta\theta$, respective PWM output periods of time are calculated in the formula (3) and transported to the timers, and respective voltage vectors are output during the respective periods of time for the purpose of outputting respective angles. Both of the methods have to convert an angle into a period of time for calculation and then provide a PWM output by means of a timer, which may result in a complex calculation process, and moreover a timing value is determined from the frequency of the modulation wave, but an input frequency may vary in the meantime, which may result in consistency of an actual PWM output angle with a predetermined angle, thus degrading the performance of and even frustrating the purpose of synchronous modulation.

SUMMARY OF THE INVENTION

An object of the invention is to provide a synchronous modulation timing method based upon space vector modulation so as to reduce the number of calculation steps and make an angle of synchronous modulation more accurate.

The invention provides a space vector based synchronous modulation method including:

sampling the frequency f of a reference voltage vector, and retrieving a carrier wave ratio N from a relationship table of frequencies and carrier wave ratios by using the frequency f;

deriving an angle $\Delta\theta$ that the reference voltage vector has undergone from $\Delta\theta=2\pi/N$ and a modulation angle $\theta_m$ of the reference voltage vector from $\theta_m=(N_{th}-1)\times\Delta\theta$, wherein $N_{th}$ represents the $N_{th}$ sampling;

retrieving a modulation ratio m from a modulation ratio vs. frequency graph;

calculating output angles of three fundamental voltage vectors of the reference voltage vector from the modulation angle $\theta_m$ of the reference voltage vector, the undergone $\Delta\theta$ and the modulation ratio m; and comparing a variation $\Delta\theta_f$ of the angle $\theta$ of the reference voltage vector with the output angles of the three fundamental voltage vectors, outputting the fundamental voltage vectors in response to a comparison result, and synthesizing the fundamental voltage vectors into an output voltage consistent with the reference voltage vector.

Preferably, the frequency f of the reference voltage vector is sampled in real time or at a preset interval of time.

Preferably, calculating the output angles of the three fundamental voltage vectors of the reference voltage vector from the modulation angle $\theta_m$ of the reference voltage vector, the undergone $\Delta\theta$ and the modulation ratio m includes:

$$\begin{cases} \Delta\theta_1 = \Delta\theta \times d_1 \\ \Delta\theta_2 = \Delta\theta \times d_2 \\ \Delta\theta_0 = \Delta\theta \times d_0, \end{cases}$$

wherein $\Delta\theta_1$, $\Delta\theta_2$ and $\Delta\theta_0$ represent the output angles of the three fundamental voltage vectors $\vec{V}_1$, $\vec{V}_2$; and $\vec{V}_{null}$ respectively, and $d_1$, $d_2$ and $d_0$ represent duty ratios with respect to the undergone $\Delta\theta$ respectively, which are derived in:

$$\begin{cases} d_1 = \sqrt{3}\, m\sin\left(\frac{\pi}{3} - \theta_m\right) \\ d_2 = \sqrt{3}\, m\sin(\theta_m) \\ d_0 = 1 - d_1 - d_2. \end{cases}$$

Preferably, comparing the variation $\Delta\theta_f$ of the angle $\theta$ of the reference voltage vector with the output angles of the three fundamental voltage vectors and outputting the fundamental voltage vectors in response to the comparison result includes:

presetting both the sequence in which the variation $\Delta\theta_f$ of the angle $\theta$ of the reference voltage vector is compared with the output angles of the three fundamental voltage vectors and their comparison values; and determining in each preset step $T_s$ whether the variation $\Delta\theta_f$ of the angle $\theta$ of the reference voltage vector is above the angle $\Delta\theta$ that the reference voltage vector has undergone, and if so, retrieving data in a buffer area and zeroing the variation $\Delta\theta_f$ of the angle $\theta$ of the reference voltage vector.

Preferably, the variation $\Delta\theta_f$ of the angle $\theta$ of the reference voltage vector is calculated in the formula $\Delta\theta_f=\theta_f(t)-\theta_f(0)=\int_0^1 2\pi f dt$, wherein each sample at an initial moment of time is assumed as $\theta_f(0)=0$, which can be discretized as $\Delta\theta_f(k)=2\pi f T_s+\Delta\theta_f(k-1)$ in each step $T_s$, wherein k represents the current moment of time, and k−1 represents the preceding moment of time.

Preferably, the method further includes the steps of: after determining whether the variation $\Delta\theta_f$ of the angle $\theta$ of the reference voltage vector is above the angle $\Delta\theta$ that the reference voltage vector has undergone, determining whether the data in the buffer area has been retrieved, and if so, increasing $N_{th}$ by one, and determining whether $N_{th}$ is above N/6, and if so, pointing to the next sector.

The invention further provides a space vector based synchronous modulation device including a presetting device and a microprocessor, wherein:

the presetting device is adapted to preset the frequency f of a reference voltage vector; and the microprocessor is adapted to perform a synchronous modulation algorithm and includes:

a sampling unit adapted to sample the frequency f of the reference voltage vector and to retrieve a carrier wave ratio N from a relationship table of frequencies and carrier wave ratios by using the frequency f;

a first calculation unit adapted to derive an angle $\Delta\theta$ that the reference voltage vector has undergone from $\Delta\theta=2\pi/N$ and a modulation angle $\theta_m$ of the reference voltage vector from $\theta_m=(N_{th}-1)\times\Delta\theta$, wherein $N_{th}$ represents the $N_{th}$ sampling;

a retrieval unit adapted to retrieve a modulation ratio m from a modulation ratio vs. frequency graph;

a second calculation unit adapted to calculate output angles of three fundamental voltage vectors of the reference voltage vector from the angle $\theta_m$ of the reference voltage vector, the undergone angle $\Delta\theta$ and the modulation ratio m;

a comparison unit adapted to compare a variation $\Delta\theta_f$ of the angle $\theta$ of the reference voltage vector with the output angles of the three fundamental voltage vectors; and an outputting unit adapted to output the fundamental voltage vectors in response to a comparison result, which are synthesized into an output voltage consistent with the reference voltage vector.

Preferably, the system further includes an inverter and an AC motor, wherein the inverter is adapted to convert a direct voltage $V_{dc}$ into three-phase alternating voltages $u_U$, $u_V$ and $u_W$ transported to the AC motor to control the frequency at which the AC motor is rotated to be consistent with the preset frequency f of the reference voltage vector.

Preferably, the second calculation unit is adapted to calculate the output angles of the three fundamental voltage vectors of the reference voltage vector from the modulation angle $\theta_m$ of the reference voltage vector, the undergone $\Delta\theta$ and the modulation ratio m in:

$$\begin{cases} \Delta\theta_1 = \Delta\theta \times d_1 \\ \Delta\theta_2 = \Delta\theta \times d_2 \\ \Delta\theta_0 = \Delta\theta \times d_0, \end{cases}$$

wherein $\Delta\theta_1$, $\Delta\theta_2$ and $\Delta\theta_0$ represent the output angles of the three fundamental voltage vectors $\vec{V}_1$, $\vec{V}_2$, and $\vec{V}_{null}$ respectively, and $d_1$, $d_2$ and $d_0$ represent duty ratios with respect to the undergone $\Delta\theta$ respectively, which are derived in $$\begin{cases} d_1 = \sqrt{3}\, m\sin\left(\frac{\pi}{3} - \theta_m\right) \\ d_2 = \sqrt{3}\, m\sin(\theta_m) \\ d_0 = 1 - d_1 - d_2. \end{cases}$$

Preferably, the microprocessor further includes a presetting unit and a determination unit, the presetting unit is adapted to preset both the sequence in which the variation $\Delta\theta_f$ of the angle $\theta$ of the reference voltage vector is compared with the output angles of the three fundamental voltage vectors and their comparison values, and the determination unit is adapted to determine in each preset step $T_s$ whether the variation $\Delta\theta_f$ of the angle $\theta$ of the reference voltage vector is above the angle $\Delta\theta$ that the reference voltage vector has undergone, and if so, to retrieve data in a buffer area and to zero the variation $\Delta\theta_f$ of the angle $\theta$ of the reference voltage vector.

Preferably, the microprocessor further includes a third calculation unit adapted to calculate the variation $\Delta\theta_f$ of the angle $\theta$ of the reference voltage vector in the formula $\Delta\theta_f = \theta_f(t) - \theta_f(0) = \int_0^t 2\pi f dt$, wherein each sample at an initial moment of time is assumed as $\theta_f(0)=0$, which can be discretized as $\Delta\theta_f(k)=2\pi f T_s + \Delta\theta_f(k-1)$ in each step $T_s$, wherein k represents the current moment of time, and k−1 represents the preceding moment of time.

Preferably, the system further includes NOT gates and a driving circuit, wherein the NOT gates are adapted to generate signals opposite to the three fundamental voltage vectors output from the outputting unit, and the driving circuit is adapted to amplify the three fundamental voltage vectors.

The invention offer the following advantages over the prior art:

The invention calculates the output angles of the three fundamental voltage vectors of the reference voltage vector from the modulation angle $\theta_m$ of the reference voltage vector, the undergone $\Delta\theta$ and the modulation ratio m, compares the variation $\Delta\theta_f$ of the angle $\theta$ of the reference voltage vector with the output angles of the three fundamental voltage vectors and outputs the corresponding fundamental voltage vector in response to a comparison result. Directly with an angle reference, the invention calculates the output angles of the three fundamental voltage vectors and compares them with the angle variation for the purpose of outputting the corresponding fundamental voltage vectors to make a voltage output from the inverter consistent with the reference voltage vector. Due to the direct use of an angle reference, the invention can dispense with conversion of an angle into a period of time for calculation and reduce the number of calculation steps and can maintain accurately a synchronous modulation angle while the frequency f of the reference voltage varies dynamically.

DETAILED DESCRIPTION OF THE INVENTION

The invention will be further detailed hereinafter in connection with the drawings and embodiments thereof to make the foregoing objects, features and advantages of the invention more apparent.

Figure 6:
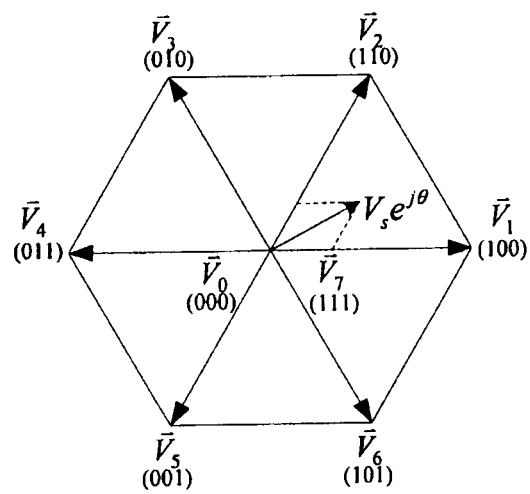
FIG. 6 illustrates a distribution diagram of voltage vectors of two-level SVPWM in the prior art.

The principal of Space Vector Pulse Width Modulation (SVPWM) will be described below taking two-level as an example to help those skilled in the art with better implementation of the invention. The SVPWM method is a PWM method derived based upon the idea of control based upon tracking the trace of a motor magnetic linkage. For an AC motor with a stator the resistance of which is neglected, integration of a voltage space vector of the motor stator is a magnetic linkage space vector of the motor stator, and therefore the magnetic linkage trace of the motor can be controlled simply by controlling the magnitude and the direction of the voltage vector of the motor and their acting periods of time. How ever, there are a limited number of fundamental voltage vectors output from a converter, and ideal voltage vectors acting on the motor and their acting periods of time which are assigned to the fundamental voltage vectors for execution under the principal of a constant magnetic linkage trace. Reference is made to FIG. 6 illustrating a distribution diagram of voltage vectors of two-level SVPWM in the prior art. As illustrated, $\vec{V}_0 \sim \vec{V}_7$ represent fundamental voltage vectors, $\vec{V}_1 \sim \vec{V}_6$ represent active voltage vectors, and $\vec{V}_0$ and $\vec{V}_7$ represent null vectors $\vec{V}_{null}$. Under the principal of voltage-second balance the following equation (4) can be derived.

$$\int_{kT}^{(k+1)T} V_s e^{j\theta} dt = \vec{V}_1 T_1 + \vec{V}_2 T_2 + \vec{V}_{null} T_0 \tag{4}$$

Where $V_s$ represents a reference voltage vector, $\vec{V}_1$, $\vec{V}_2$ and $\vec{V}_{null}$ represent three fundamental voltage vectors synthesizing the reference voltage vector $V_s$, and $T_1$, $T_2$ and $T_0$ represent acting periods of time of the fundamental voltage vectors $\vec{V}_1$, $\vec{V}_2$ and $\vec{V}_{null}$. The equation (5) can be derived by solving the equation (4).

$$\begin{cases} T_1 = \sqrt{3}\, mT\sin\left(\frac{\pi}{3} - \theta\right) \\ T_2 = \sqrt{3}\, mT\sin(\theta) \\ T_0 = T - T_1 - T_2 \end{cases} \quad (5)$$

Without loss of calculation generality, the duty ratio dx=Tx/T of the acting period of time of a fundamental voltage vector is typically calculated in an algorithm independent of T, and if necessary, the acting period of time T is calculated from Tx=T*dx. The corresponding duty ratio equation (6) can be derived from the equation (5).

$$\begin{cases} d_1 = \sqrt{3}\, m\sin\left(\frac{\pi}{3} - \theta\right) \\ d_2 = \sqrt{3}\, m\sin(\theta) \\ d_0 = 1 - d_1 - d_2 \end{cases} \quad (6)$$

Figure 7:
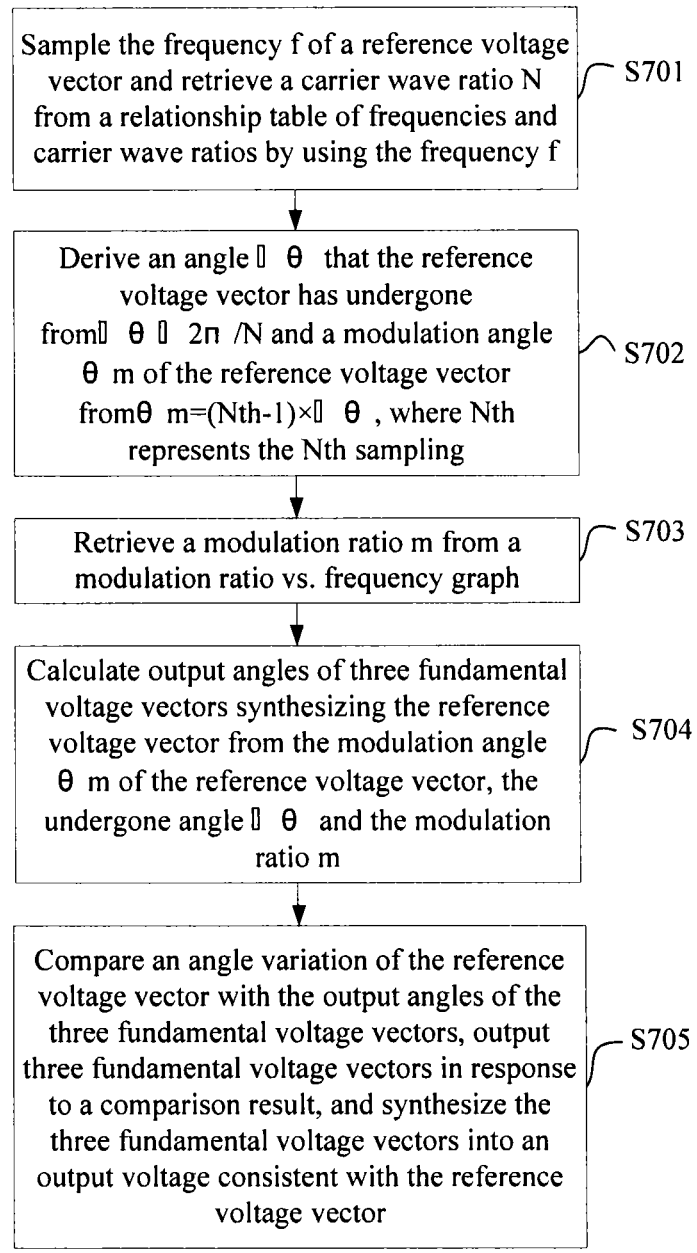
FIG. 7 illustrates a flow chart of a first embodiment of a space vector based synchronous modulation method according to the invention.

An embodiment of the method according to the invention will be detailed below with reference to FIG. 7 illustrating a flow chart of a first embodiment of a space vector based synchronous modulation method according to the invention.

S701: The frequency f of a reference voltage vector is sampled, and a carrier wave ratio N is retrieved from a relationship table of frequencies and carrier wave ratios by using the frequency f.

S702: An angle $\Delta\theta$ that the reference voltage vector has undergone is derived from $\Delta\theta=2\pi/N$, and a modulation angle $\theta_m$ of the reference voltage vector is derived from $\theta_m=(N_{th}-1)\times\Delta\theta$, where $N_{th}$ represents the $N_{th}$ sampling, i.e., the $N_{th}$ sampling of the reference voltage vector, and the number of times that it is sampled is N/6 per sector. The angle $\Delta\theta$ that the reference voltage vector has undergone is an angle to be output from synchronous modulation.

S703: A modulation ratio m is retrieved from a modulation ratio vs. frequency graph.

S704: Output angles of three fundamental voltage vectors synthesizing the reference voltage vector are calculated from the modulation angle $\theta_m$ of the reference voltage vector, the undergone angle $\Delta\theta$ and the modulation ratio m. The sum of the output angles of the three fundamental voltage vectors is the angle to be output from synchronous modulation.

S705: A variation $\Delta\theta_f$ of the angle $\theta$ of the reference voltage vector is compared with the output angles of the three fundamental voltage vectors, and the fundamental voltage vectors are output in response to a comparison result and synthesized into an output voltage consistent with the reference voltage vector.

The invention compares the variation $\Delta\theta_f$ of the angle $\theta$ of the reference voltage vector with the output angles of the three fundamental voltage vectors for the purpose of outputting the fundamental voltage vectors directly with an angle reference for calculation without converting any angle into a period of time, thus reducing the number of calculation steps to facilitate synchronous modulation.

An introduction will be presented below of how to calculate the output angles of the three fundamental voltage vectors synthesizing the reference voltage vector from the modulation angle $\theta_m$ of the reference voltage vector, the undergone angle $\Delta\theta$ and the modulation ratio m. Although the angle speed of the reference voltage vector is constantly changing, an average speed of the angle $\Delta\theta$ that the reference voltage vector has undergone can be assumed as $\omega_{av}$, and a period of time during which $\Delta\theta$ has been undergone can be derived in the formula (7), and the formula (8) can be derived by substituting the formula (7) into the formula (5).

$$T = \frac{\Delta\theta}{\omega_{av}} \quad (7)$$

$$\begin{cases} \frac{\Delta\theta_1}{\omega_{av}} = \sqrt{3}\, m\frac{\Delta\theta}{\omega_{av}}\sin\left(\frac{\pi}{3} - \theta_m\right) \\ \frac{\Delta\theta_2}{\omega_{av}} = \sqrt{3}\, m\frac{\Delta\theta}{\omega_{av}}\sin(\theta_m) \\ \frac{\Delta\theta_0}{\omega_{av}} = \frac{\Delta\theta}{\omega_{av}} - \frac{\Delta\theta_1}{\omega_{av}} - \frac{\Delta\theta_2}{\omega_{av}} \end{cases} \quad (8)$$

$\Delta\theta_1$, $\Delta\theta_2$ and $\Delta\theta_0$ in the formula (7) represent output angles of three fundamental voltage vectors $\vec{V}_1$, $\vec{V}_2$ and $\vec{V}_{null}$ respectively. The formula (8) can be reduced into the formula (9) which is divided by $\Delta\theta$ at both sides thereof into the formula (10).

$$\begin{cases} \Delta\theta_1 = \sqrt{3}\, m\Delta\theta\sin\left(\frac{\pi}{3} - \theta_m\right) \\ \Delta\theta_2 = \sqrt{3}\, m\Delta\theta\sin(\theta_m) \\ \Delta\theta_0 = \Delta\theta - \Delta\theta_1 - \Delta\theta_2 \end{cases} \quad (9)$$

$$\begin{cases} d_1 = \sqrt{3}\, m\sin\left(\frac{\pi}{3} - \theta_m\right) \\ d_2 = \sqrt{3}\, m\sin(\theta_m) \\ d_0 = 1 - d_1 - d_2 \end{cases} \quad (10)$$

Although the formula (10) and the formula (6) are formally identical, $d_1$, $d_2$ and $d_0$ in the formula (10) represent duty ratios with respect to the angle $\Delta\theta$ instead of a period of time. In order to derive actual output angles as desired, it will be sufficient to multiple $d_1$, $d_2$ and $d_0$ by $\Delta\theta$ in the formula (11), where $\Delta\theta_1$, $\Delta\theta_2$ and $\Delta\theta_0$ represent the output angles of the three fundamental voltage vectors $\vec{V}_1$, $\vec{V}_2$ and $\vec{V}_{null}$ respectively.

$$\begin{cases} \Delta\theta_1 = \Delta\theta \times d_1 \\ \Delta\theta_2 = \Delta\theta \times d_2 \\ \Delta\theta_0 = \Delta\theta \times d_0 \end{cases} \quad (11)$$

Figure 8:
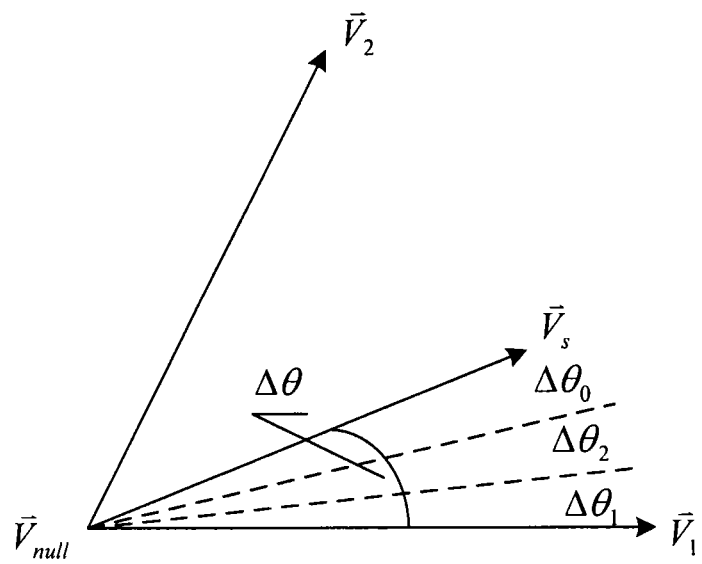
FIG. 8 illustrates a relationship between output angles of fundamental voltage vectors and the fundamental voltage vectors according to the invention.

Reference is made to FIG. 8 illustrating a relationship diagram between output angles of fundamental voltage vectors and the fundamental voltage vectors according to the invention. In FIG. 8, $\vec{V}_s$ represents the reference voltage vector, $\Delta\theta$ represents angle that the reference voltage vector undergoes, $\vec{V}_1$, $\vec{V}_2$ and $\vec{V}_{null}$ represent three fundamental voltage vectors synthesizing the reference voltage vector $\vec{V}_s$, and $\Delta\theta_1$, $\Delta\theta_2$, and $\Delta\theta_0$ represent output angles of the three fundamental voltage vectors $\vec{V}_1$, $\vec{V}_2$ and $\vec{V}_{null}$ respectively. The sum of the output angles $\Delta\theta_1$, $\Delta\theta_2$ and $\Delta\theta_0$ of the three fundamental voltage vectors represents the angle $\Delta\theta$ to be output from synchronous modulation.

A specific introduction will be presented below of how to calculate a variation $\Delta\theta_f$ of the angle $\theta$ of the reference voltage vector. $\theta_f(t)=\int_0^1 2\pi f dt + \theta_f(0)$ can be derived from the relationship between an angle and an angle frequency $\theta=\int\omega dt=\int 2\pi f dt$, and each sample at an initial moment of time is assumed as $\theta_f(0)=0$, so the variation $\Delta\theta_f$ of derived $\theta_f(t)$ is $\Delta\theta_f=\theta_f(t)-\theta_f(0)=\int_0^1 2\pi f dt$, which can be discretized as $\Delta\theta_f(k)=2\pi f T_s+(k-$ 1) in each step $T_s$, where k represents the current moment of time, and k−1 represents the preceding moment of time.

A specific introduction will be presented below of how to output a fundamental voltage vector. The variation $\Delta\theta_f$ of the angle θ of the reference voltage vector is compared with the output angles of the three fundamental voltage vectors, and the respective fundamental voltage vectors are output in response to a comparison result.

Figure 9:
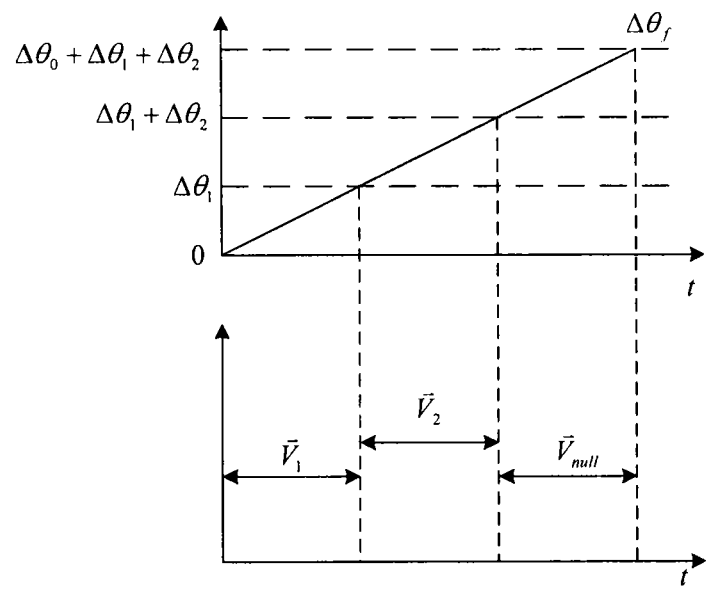
FIG. 9 illustrates a first schematic diagram of an angle variation of a reference voltage vector vs. output angles of fundamental voltage vectors according to the invention.

Reference is made to FIG. 9 illustrating a first schematic diagram of an angle variation of a reference voltage vector vs. output angles of fundamental voltage vectors according to the invention. As can be apparent from FIG. 9, as $\Delta\theta_f$ increases, it can be derived from comparison that the fundamental voltage vector $\vec{V}_1$ is output when $\Delta\theta_f$ is below $\Delta\theta_1$, that the fundamental voltage vector $\vec{V}_2$ is output when $\Delta\theta_f$ is above $\Delta\theta_1$ and below $\Delta\theta_1+\Delta\theta_2$, and that the fundamental voltage vector $\vec{V}_{null}$ is output when $\Delta\theta_f$ is above $\Delta\theta_1+\Delta\theta_2$ and below $\Delta\theta_0+\Delta\theta_1+\Delta\theta_2$. The invention can adjust both the sequence in which the angles are compared with and their comparison values as needed in practice to control the sequence and the manner in which the fundamental voltage vectors are output.

Figure 10:
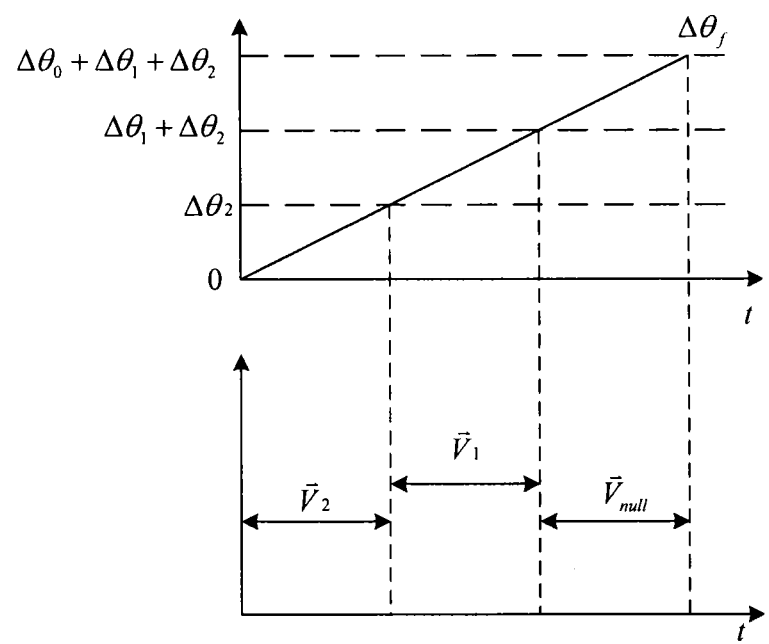
FIG. 10 illustrates a second schematic diagram of an angle variation of a reference voltage vector vs. output angles of fundamental voltage vector according to the invention.

Reference is made to FIG. 10 illustrating a second schematic diagram of an angle variation of a reference voltage vector vs. output angles of fundamental voltage vectors according to the invention, where $\Delta\theta_2$ is compared with firstly and correspondingly the fundamental voltage vector $\vec{V}_2$ is output firstly.

Alternatively, of course, firstly $\frac{1}{2}*\Delta\theta_2$ can be compared with and correspondingly the fundamental voltage vector $\vec{V}_2$ can be output, then $\frac{1}{2}*\Delta\theta_2+\Delta\theta_1$ can be compared with and correspondingly the fundamental voltage vector $\vec{V}_1$ can be output, next $\frac{1}{2}*\Delta\theta_2+\Delta\theta_1+\Delta\theta_0$ can be compared with and correspondingly the fundamental voltage vector $\vec{V}_{null}$ can be output, and finally $\Delta\theta_2+\Delta\theta_1+\Delta\theta_0$ can be compared with and correspondingly the fundamental voltage vector $\vec{V}_2$ can be output.

Figure 11:
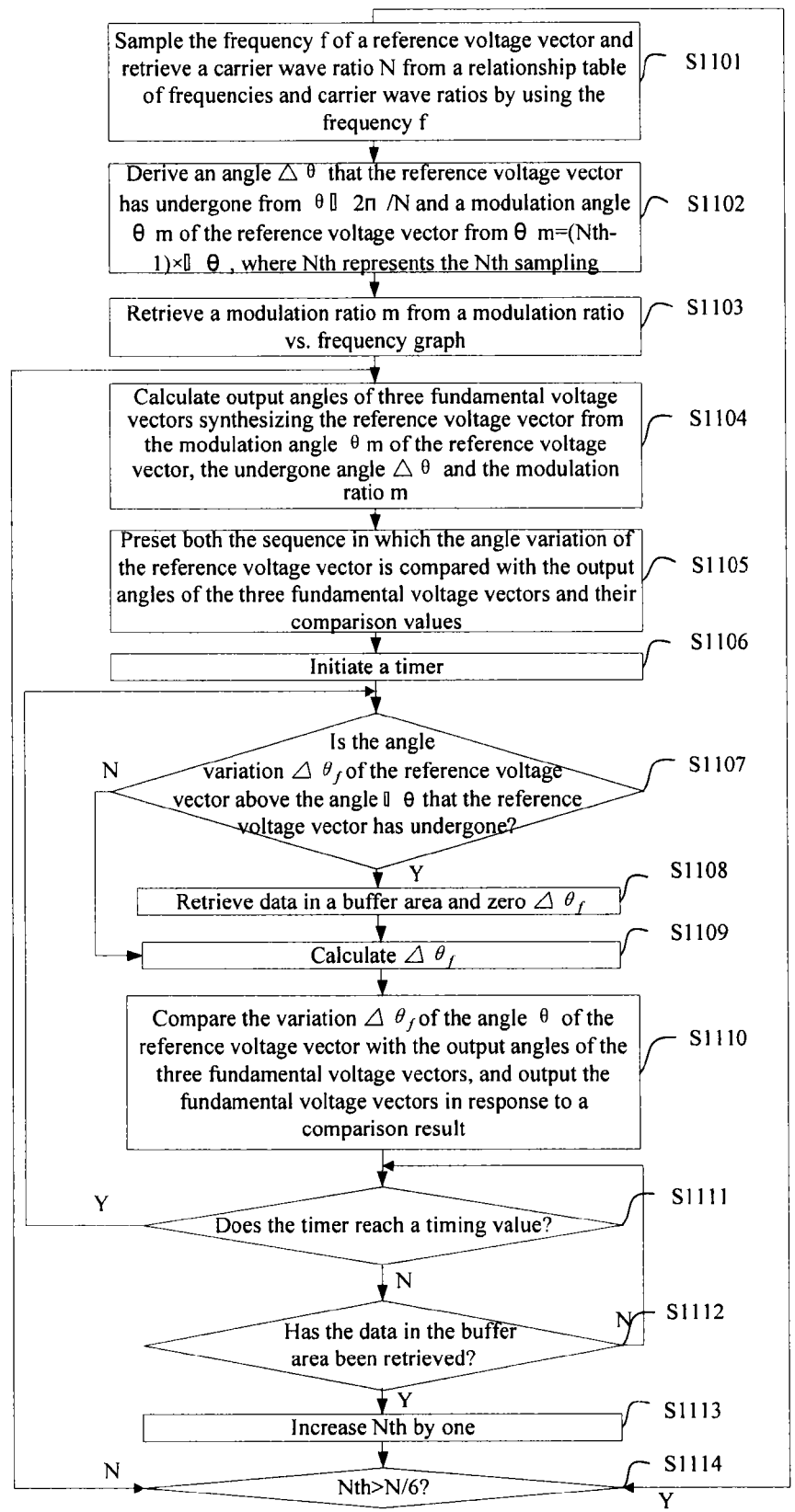
FIG. 11 illustrates a flow chart of a second embodiment of the space vector based synchronous modulation method according to the invention.

An embodiment of the method according to the invention will be detailed below with reference to FIG. 11. Reference is made to FIG. 11 illustrating a flow chart of a second embodiment of a space vector based synchronous modulation method according to the invention. The method includes the following steps:

S1101: The frequency f of a reference voltage vector is sampled, and a carrier wave ratio N is retrieved from a relationship table of frequencies and carrier wave ratios by using the frequency f. The sampled frequency f of the reference voltage vector can be acquired in real time or at a predetermined interval of time.

S1102: An angle $\Delta\theta$ that the reference voltage vector has undergone is derived in $\Delta\theta=2\pi/N$, and a modulation angle $\theta_m$ of the reference voltage vector is derived in $\theta_m=(N-1)\times\Delta\theta$, where $N_{th}$ represents the $N_{th}$ sampling, i.e., the $N_{th}$ sampling of the reference voltage vector, and the number of times that it is sampled is N/6 per sector. The angle $\Delta\theta$ that the reference voltage vector has undergone is an angle to be output from synchronous modulation.

Figure 1:
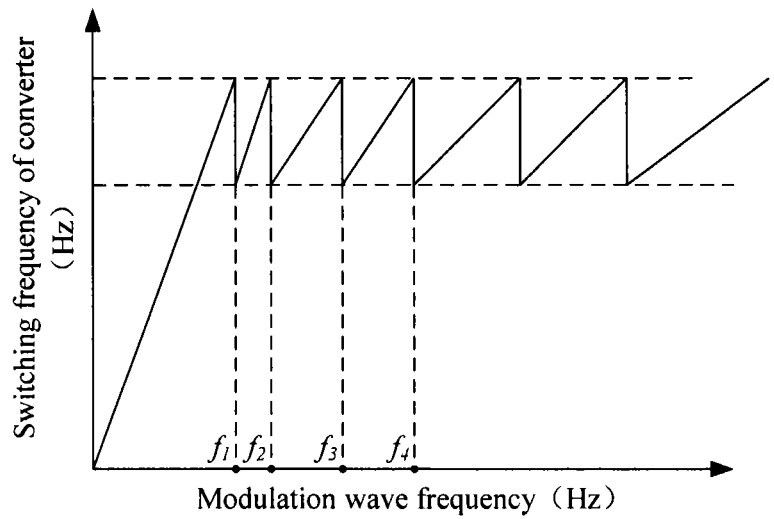
FIG. 1 illustrates a schematic diagram of segmented synchronous modulation in the prior art.
Figure 2:
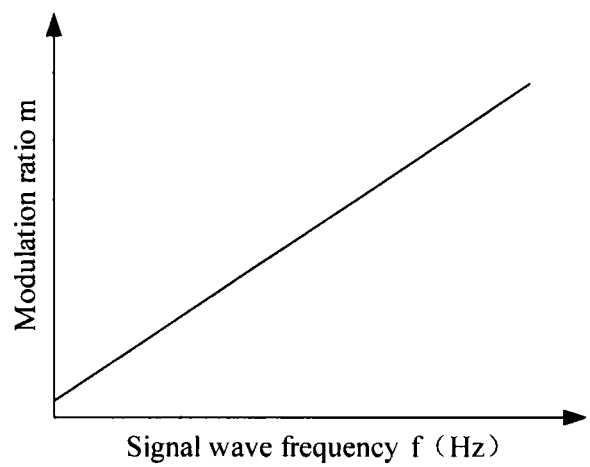
FIG. 2 illustrates a modulation ratio vs. frequency graph in the prior art.
Figure 3:
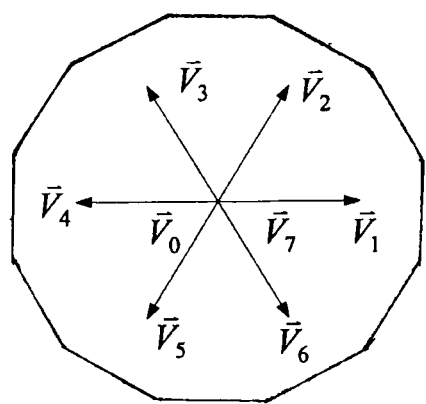
FIG. 3 illustrates a normal dodecagon in the polygonal trace tracking method in the prior art.
Figure 4:
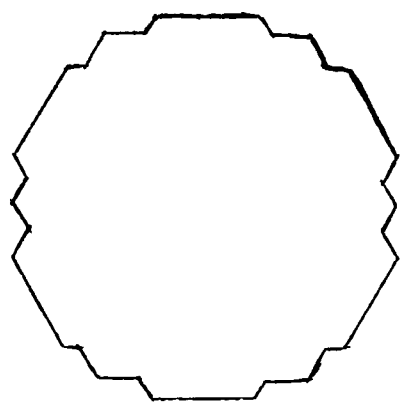
FIG. 4 illustrates a thirty-edge polygonal trace of a magnetic linkage in the polygonal trace tracking method in the prior art.
Figure 5:
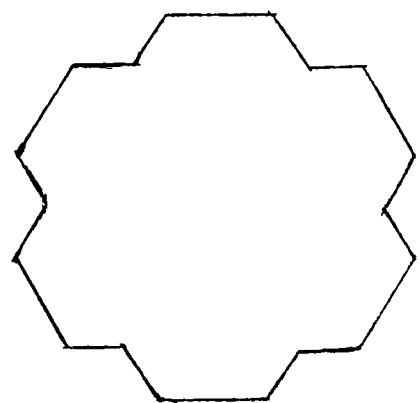
FIG. 5 illustrates an eighteen-edge polygonal trace of a magnetic linkage in the polygonal trace tracking method in the prior art.

S1103: A modulation ratio m is retrieved from A modulation ratio vs. frequency graph as illustrated in FIG. 2.

S1104: Output angles of three fundamental voltage vectors synthesizing the reference voltage vector are calculated from the modulation angle $\theta_m$ of the reference voltage vector, the undergone angle $\Delta\theta$ and the modulation ratio m. The sum of the output angles of the three fundamental voltage vectors is the angle to be output from synchronous modulation.

S1105: Both the sequence in which the angle variation of the reference voltage vector is compared with the output angles of the three fundamental voltage vectors and their comparison values are preset. The invention can adjust the sequence in which the angles are compared and their values for comparison as needed in practice to control the sequence and the manner in which the fundamental voltage vectors are output. Referring to FIG. 9 and FIG. 10, the two different comparison sequences with different comparison values correspond to the different sequences in which the fundamental voltage vectors are output. Alternatively, the comparison values can be varied so that the fundamental voltage vectors with different values will be output.

S1106: A timer is initiated.

S1107: It is determined whether the angle variation $\Delta\theta_f$ of the reference voltage vector is above the angle $\Delta\theta$ that the reference voltage vector has undergone. If so, the flow goes to S1108; otherwise, the flow goes to S1109.

S1108: Data in a buffer area is retrieved, and $\Delta\theta_f$ is zeroed.

S1109: $\Delta\theta_f$ is calculated in the formula (12) and recalculated each time $\Delta\theta_f$ is zeroed.

S1110: The variation $\Delta\theta_f$ of the angle θ of the reference voltage vector is compared with the output angles of the three fundamental voltage vectors, and the respective fundamental voltage vectors are output in response to a comparison result. For example, reference is made to FIG. 9 illustrating a first schematic diagram of an angle variation of a reference voltage vector vs. output angles of fundamental voltage vectors according to the invention. As illustrated, as $\Delta\theta_f$ increases, it can be derived from comparison that the fundamental voltage vector $\vec{V}_1$ is output when $\Delta\theta_f$ is below $\Delta\theta_1$, that the fundamental voltage vector $\vec{V}_2$ is output when $\Delta\theta_f$ is above $\Delta\theta_1$ and below $\Delta\theta_1+\Delta\theta_2$, and that the fundamental voltage vector $\vec{V}_{null}$ is output when $\Delta\theta_f$ is above $\Delta\theta_1+\Delta\theta_2$ and be low $\Delta\theta_0+\Delta\theta_1+\Delta\theta_2$.

S1111: It is determined whether the timer has reaches a timing value. If so, the flow goes to S1107; otherwise, the flow goes to S112.

S1112: It is determined whether the data in the buffer area has been retrieved. If so, the flow goes to S1113; otherwise the flow goes to S1111.

S1113: $N_{th}$ is increased by one, which indicates that the next sampling will be performed, that is, the frequency of the next reference voltage vector will be acquired.

S1114: $N_{th}>N/6$. It is determined whether $N_{th}$ is above N/6, and if so, the flow goes to S1101; otherwise, the flow goes to S1104. If $N_{th}>N/6$, it indicates that the present cell has been traversed, and the flow goes to S1101 pointing to the next sector.

The method according to the embodiment of the invention controls the fundamental voltage vectors to be output directly through comparison of the angles without converting any angle into a period of time, thus reducing the number of calculation steps. Since the frequency f of the reference voltage vector is acquired in real time or at a preset interval of time, $\Delta\theta_f$ is calculated in an integration algorithm, and then a period of time to calculate $\Delta\theta_f$ is controlled by means of the timer so that the shorter the period of time, the more accurate a calculation result will be, thus taking into account also a variation of the frequency f and making a synchronous modulation angle more accurate. The formula (10) in this method can be multiplied by an angle to result in an output angle of synchronous modulation and by a period of time to result in a timing value of asynchronous modulation, and formulas of SVPWM asynchronous modulation and synchronous modulation can be unified to facilitate execution of the algorithm.

The synchronous modulation method according to the invention is applicable to any number of levels, and the calculation process will not be further complicated due to an increased number of levels.

For the foregoing space vector based synchronous modulation method, the invention further provides a space vector based synchronous modulation system, and components there of will be detailed below in connection with embodiments thereof.

Figure 12:
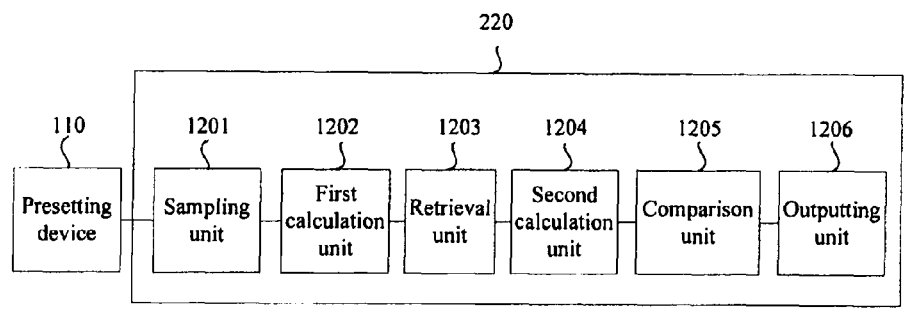
FIG. 12 illustrates a structural diagram a first embodiment of a space vector based synchronous modulation system according to the invention.

Reference is made to FIG. 12 illustrating a structural diagram of a first embodiment of the space vector based synchronous modulation system.

The system includes a presetting device 110 and a microprocessor 220.

The presetting device 110 presets the frequency f of the reference voltage vector by a frequency presetting signal which is preset from a potentiometer, converted into a digital signal via an analog-to-digital converter and transported to a sampling unit 1201 of the microcontroller 220.

The microprocessor 220 is the core of the entire system to execute the synchronous modulation algorithm and particularly includes a sampling unit 1201, a first calculation unit 1202, a retrieval unit 1203, a second calculation unit 1024, a comparison unit 1025 and an outputting unit 1206.

The sampling unit 1201 samples the frequency f of the reference voltage vector preset from the presetting device 110 and retrieves a carrier wave ratio N from a relationship table of frequencies and carrier wave ratios by using the frequency f.

The first calculation unit 1202 derives an angle $\Delta\theta$ that the reference voltage vector has undergone from $\Delta\theta=2\pi/N$ and a modulation angle $\theta_m$ of the reference voltage vector from $\theta_m=(N_{th}-1)\times\Delta\theta$, where $N_{th}$ represents the $N_{th}$ sampling, i.e., the $N_{th}$ sampling of the reference voltage vector, and the number of times that it is sampled is N/6 per sector. The angle $\Delta\theta$ that the reference voltage vector has undergone is an angle to be output from synchronous modulation.

The retrieval unit 1203 retrieves a modulation ratio m from a modulation ratio vs. frequency graph as illustrated in FIG. 2.

The second calculation unit 1204 calculates output angles of three fundamental voltage vectors synthesizing the reference voltage vector from the angle $\theta_m$ of the reference voltage vector, the undergone angle $\Delta\theta$ and the modulation ratio m.

The comparison unit 1025 compares a variation $\Delta\theta_f$ of the angle $\theta$ of the reference voltage vector with the output angles of the three fundamental voltage vectors.

The outputting unit 1206 outputs the fundamental voltage vectors in response to a comparison result, which are synthesized into an output voltage consistent with the reference voltage vector.

The invention compares the variation $\Delta\theta_f$ of the angle $\theta$ of the reference voltage vector with the output angles of the three fundamental voltage vectors through the comparison unit 1205 and outputs the fundamental voltage vectors in response to a comparison result through the outputting unit 206 directly with an angle reference for calculation without converting any angle into a period of time, thus reducing the number of calculation steps to facilitate synchronous modulation.

Figure 13:
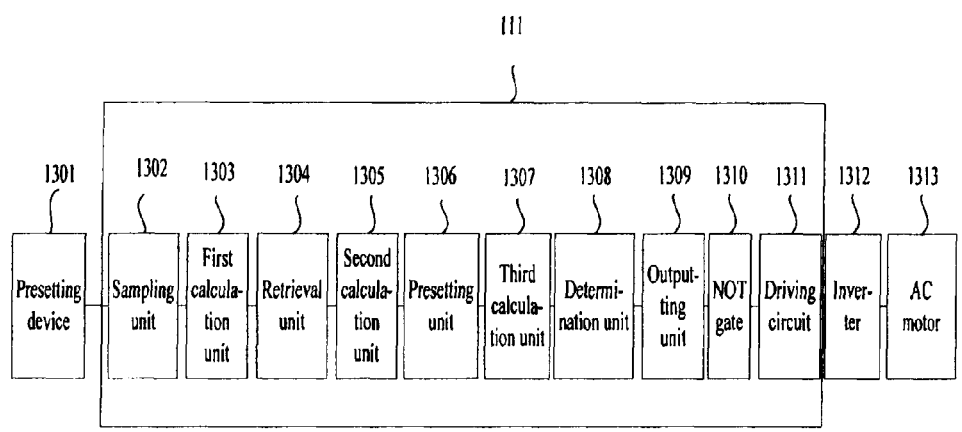
FIG. 13 illustrates a structural diagram a second embodiment of the space vector based synchronous modulation system according to the invention.

Reference is made to FIG. 13 illustrating a structural diagram of a second embodiment of a space vector based synchronous modulation system. An application of the invention will be described taking an inverting system as an example. Of course, the invention can also be applied in another current alternation system, e.g., in a rectifying system. The second embodiment of the system according to the invention differs from the first embodiment of the system merely in addition of a presetting unit 1306, a third calculation unit 1307 and a determination unit 1308.

The presetting unit 1306 presets both the sequence in which the variation $\Delta\theta_f$ of the angle $\theta$ of the reference voltage vector is compared with the output angles of the three fundamental voltage vectors and their comparison values.

The third calculation unit 1307 calculates the variation $\Delta\theta_f$ of the angle $\theta$ of the reference voltage vector particularly as $\Delta\theta_f=\theta_f(t)-\theta_f(0)=\int_0^1 2\pi f dt$, where each sample at an initial moment of time is assumed as $\theta_f(0)=0$, which can be discretized as $\Delta\theta_f(k)=2\pi f T_s+\Delta\theta_f(k-1)$ in each step $T_s$, where k represents the current moment of time, and k−1 represents the preceding moment of time.

The determination unit 1308 determines in each preset step $T_s$ whether the variation $\Delta\theta_f$ of the angle $\theta$ of the reference voltage vector is above the angle $\Delta\theta$ that the reference voltage vector has undergone, and if so, it retrieves data in a buffer area and zeroes the variation $\Delta\theta_f$ of the angle $\theta$ of the reference voltage vector.

The system according to the embodiment of the invention controls the fundamental voltage vectors to be output directly through comparison of the angles without converting any angle into a period of time, thus reducing the number of calculation steps. Since the frequency f of the reference voltage vector is acquired in real time or at a preset interval of time, $\Delta\theta_f$ is calculated in an integration algorithm, and then the step $T_s$ at which $\Delta\theta_f$ is calculated so that the shorter $T_s$ is (that is, the shorter the period of time is), the more accurate a calculation result will be, thus taking into account a variation of the frequency f and making a synchronous modulation angle more accurate.

An embodiment of the invention will be detailed below in connection with a practical application of the invention to help those skilled in the art with more sufficient implementation of the invention.

The system according to the embodiment of the invention can further includes a NOT gate 1311, a driving circuit 1312, an inverter 1313 and an AC motor 1314.

The NOT gate 1311 reverses a switching signal output from the microcontroller. The signal output from the microprocessor includes a branch supplied directly to a power electronic device of the inverter 1313 and a branch supplied to another power electronic device of the same bridge arm of the inverter 1313 through the NOT gate 1311.

The driving circuit 1312 boosts a capacity to drive the switching signal output from the microcontroller.

The inverter 1313 converts a DC voltage into a three-phase AC voltage transported to the AC motor 1314.

The AC motor 1314 acts as a control subject to which the three-phase AC voltage output from the inverter 1313 is transmitted to make the frequency at which the AC motor 1314 is rotated consistent with the predetermined frequency f.

Figure 14:
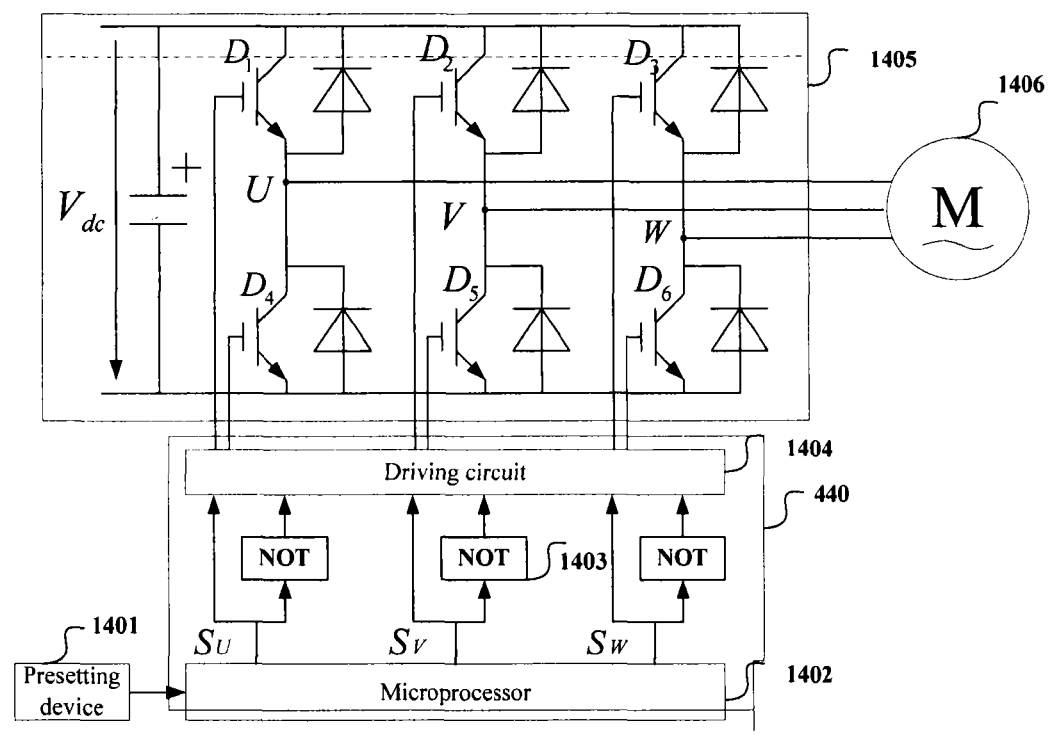
FIG. 14 illustrates a structural block diagram corresponding to FIG. 13.

Reference is made to FIG. 14 illustrating a circuit principal diagram of the second embodiment of the space vector based synchronous modulation system according to the invention, which includes a presetting device 1401, a control device 440, an inverter 1405 and an AC motor 1406, where the control device 440 includes a microprocessor 1402, NOT gates 1403 and a driving circuit 1404.

The presetting device 1401 presets the frequency f of the reference voltage vector by a frequency presetting signal which is preset from a potentiometer or a signal generator, converted into a digital signal via an analog-to-digital converter and transported to the microcontroller 1420.

The microprocessor 1420 is the core of the entire system to execute the synchronous modulation algorithm. The synchronous modulation algorithm is executed on the frequency f of the received reference voltage vector to output corresponding fundamental voltage vectors.

The NOT gates 1403 reverse switching signals output from the microcontroller 1420.

The driving circuit 1404 amplifies the switching signals output from the microprocessor 1402.

The inverter 1405 converts a direct voltage $V_{dc}$ into three-phase alternating voltages $u_U$, $u_V$ and $u_W$ and includes a filter capacitor and six power electronic devices. The filter capacitor functions to ensure stability of the direct voltage, and the power electronic devices D1 and D4, D2 and D5 and D3 and D6 constitute respective bridge arms to control respective phase voltages. The respective power electronic devices are turned on when the switching signals output from the microprocessor 1402 are 1 or turned off when they are 0. The switching signals output from the microprocessor 1402 are transported directly to D1, D2 and D3 respectively and reversed through the NOT gates 1403 and transported to D4, D5 and D5 respectively, and every two complementary signals constitute one of the bridge arms. The three bridge arms are controlled by the three switching signals $S_U$, $S_V$ and $S_W$ output from the microprocessor 1402, which are different so that the inverter 1405 outputs different voltage vectors to control the AC motor 1406 in a way that the frequency at which the AC motor 1406 is rotated will be consistent with the frequency f preset from the presetting device 1401.

How to perform synchronous modulation according to the invention will be detailed below with reference to FIG. 6 and FIG. 14 taking a two-level voltage space vector as an example. For example, the microprocessor 1402 in FIG. 14 output the fundamental voltage vector $\vec{V}_2$. Reference is made to FIG. 6 illustrating a distribution diagram of voltage vectors of two-level SVPWM. $\vec{V}_2$ corresponds to a switching signal 110, that is, $S_U$, $S_V$ and $S_W$ correspond respectively to switch statuses of 1, 1 and 0, and the corresponding power electronic devices D1, D2 and D3 are in on, on and off statues respectively, and the corresponding power electronic devices D4, D5 and D6 are in off, off and on statues respectively. The inverter converts the direct voltage $V_{dc}$ into the three-phase alternating voltages $u_U$, $u_V$ and $u_W$ in response to the switch statuses of the power electronic devices and transport the three-phase alternating voltages to the AC motor 1406 so that the frequency at which the AC motor 1406 is rotated will be consistent with the frequency f preset from the presetting device 1401 to thereby achieve synchronous modulation.

Since the frequency f of the reference voltage vector is acquired in real time or at a preset interval of time, an angle variation of the reference voltage vector is calculated in the integration algorithm, thus taking into account also a variation of the frequency f and making a synchronous modulation angle more accurate.

The synchronous modulation system according to the invention is applicable to any number of levels, and the calculation process will not be further complicated due to an increased number of levels.

The foregoing descriptions are merely illustrative of the preferred embodiments of the invention but not limitative of the invention in any way. Although the invention has been disclosed as above in the preferred embodiments, they are not intended to limit the invention. Any skilled in the art can make numerous possible modifications and variations to the technical solution of the invention in light of the foregoing method and technical disclosure without departing from the scope of the technical solution of the invention. Accordingly, any apparent modifications, equivalents and adaptations that can be made to the foregoing embodiments in light of the technical spirit of the invention without departing from the disclosure of the technical solution of the invention shall come into the claimed scope of the technical solution of the invention.

The invention claimed is:

1. A space vector based synchronous modulation method, comprising:

sampling, by a sampling unit of a microprocessor, the frequency f of a reference voltage vector, and retrieving a carrier wave ratio N from a relationship table of frequencies and carrier wave ratios by using the frequency f;

deriving, by a first calculation unit of the microprocessor, an angle $\Delta\theta$ that the reference voltage vector has undergone from $\Delta\theta = 2\pi/N$ and a modulation angle $\theta_m$ of the reference voltage vector from $\theta_m = (N_{th}-1) \times \Delta\theta$, wherein $N_m$ represents the $N_{th}$ sampling;

retrieving, by a retrieval unit of the microprocessor, a modulation ratio m from a modulation ratio vs. frequency graph;

calculating, by a second calculation unit of the microprocessor, output angles of three fundamental voltage vectors synthesizing the reference voltage vector from the modulation angle $\theta_m$ of the reference voltage vector, the undergone angle $\Delta\theta$ and the modulation ratio m; and comparing, by a comparison unit of the microprocessor, a variation $\Delta\theta_f$ of the angle $\theta$ of the reference voltage vector with the output angles of the three fundamental voltage vectors, outputting, by an outputting unit of the microprocessor, the fundamental voltage vectors in response to a comparison result, and synthesizing the fundamental voltage vectors into an output voltage consistent with the reference voltage vector.

2. The method according to claim 1, wherein the frequency f of the reference voltage vector is sampled in real time or at a preset interval of time.

3. The method according to claim 1, wherein calculating the output angles of the three fundamental voltage vectors synthesizing the reference voltage vector from the modulation angle $\theta_m$ of the reference voltage vector, the undergone angle $\Delta\theta$ and the modulation ratio m comprises:

$$\begin{cases} \Delta\theta_1 = \Delta\theta \times d_1 \\ \Delta\theta_2 = \Delta\theta \times d_2 \\ \Delta\theta_0 = \Delta\theta \times d_0, \end{cases}$$

wherein $\Delta\theta_1$, $\Delta\theta_2$ and $\Delta\theta_0$ represent the output angles of the three fundamental voltage vectors, $\vec{V}_1$, $\vec{V}_2$ and $\vec{V}_{null}$ respectively, and $d_1$, $d_2$ and $d_0$ represent duty ratios with respect to the undergone angle $\Delta\theta$ respectively, which are derived in:

$$\begin{cases} d_1 = \sqrt{3}\, m\sin\left(\frac{\pi}{3} - \theta_m\right) \\ d_2 = \sqrt{3}\, m\sin(\theta_m) \\ d_0 = 1 - d_1 - d_2. \end{cases}$$

4. The method according to claim 1, wherein comparing the variation $\Delta\theta_f$ of the angle $\theta$ of the reference voltage vector with the output angles of the three fundamental voltage vectors and outputting the fundamental voltage vectors in response to the comparison result comprises:
  presetting, by a presetting unit of the microprocessor, both the sequence in which the variation $\Delta\theta_f$ of the angle $\theta$ of the reference voltage vector is compared with the output angles of the three fundamental voltage vectors and their comparison values; and
  determining, by a determining unit of the microprocessor, in each preset step $T_s$ whether the variation $\Delta\theta_f$ of the angle $\theta$ of the reference voltage vector is above the angle $\Delta\theta$ that the reference voltage vector has undergone, and if so, retrieving data in a buffer area and zeroing the variation $\Delta\theta_f$ of the angle $\theta$ of the reference voltage vector.

5. The method according to claim 4, wherein the variation $\Delta\theta_f$ of the angle $\theta$ of the reference voltage vector is calculated in the formula $\Delta\theta_f=\theta_f(t)-\theta_f(0)=\int_0^t 2\pi f dt$, wherein each sample at an initial moment of time is assumed as $\theta_f(0)=0$, which is discretized as $\Delta\theta_f(k)=2\pi f T_x+\Delta\theta_f(k-1)$ in each step $T_s$, wherein k represents the current moment of time, and k−1 represents the preceding moment of time.

6. The method according to claim 4, wherein after determining whether the variation $\Delta\theta_f$ of the angle $\theta$ of the reference voltage vector is above the angle $\Delta\theta$ that the reference voltage vector has undergone, the method further comprises the steps of: determining whether the data in the buffer area has been retrieved, and if so, increasing $N_{th}$ by one; determining whether $N_{th}$ is above N/6, and if so, pointing to the next sector.

7. A space vector based synchronous modulation system, comprising a presetting device and a microprocessor, wherein:
  the presetting device is adapted to preset the frequency f of a reference voltage vector; and
  the microprocessor is adapted to perform a synchronous modulation algorithm and comprises:
  a sampling unit adapted to sample the frequency f of the reference voltage vector and to retrieve a carrier wave ratio N from a relationship table of frequencies and carrier wave ratios by using the frequency f;
  a first calculation unit adapted to derive an angle $\Delta\theta$ that the reference voltage vector has undergone from $\Delta\theta=2\pi/N$ and a modulation angle $\theta_m$ of the reference voltage vector from $\theta_m=(N_{th}-1)\times\Delta\theta$, wherein $N_{th}$ represents the $N_{th}$ sampling;
  a retrieval unit adapted to retrieve a modulation ratio m from a modulation ratio vs. frequency graph;
  a second calculation unit adapted to calculate output angles of three fundamental voltage vectors synthesizing the reference voltage vector from the modulation angle $\theta_m$ of the reference voltage vector, the undergone angle $\Delta\theta$ and the modulation ratio m;
  a comparison unit adapted to compare a variation $\Delta\theta_f$ of the angle $\theta$ of the reference voltage vector with the output angles of the three fundamental voltage vectors; and
  an outputting unit adapted to output the fundamental voltage vectors in response to a comparison result, which are synthesized into an output voltage consistent with the reference voltage vector.

8. The system according to claim 7, further comprising an inverter and an AC motor, wherein the inverter is adapted to convert a direct voltage $V_{dc}$ into three-phase alternating voltages $u_U$, $u_V$ and $u_W$ transported to the AC motor to control the frequency at which the AC motor is rotated to be consistent with the preset frequency f of the reference voltage vector.

9. The system according to claim 7, wherein the second calculation unit is adapted to calculate the output angles of the three fundamental voltage vectors synthesizing the reference voltage vector from the modulation angle $\theta_m$ of the reference voltage vector, the undergone angle $\Delta\theta$ and the modulation ratio m in:

$$\begin{cases} \Delta\theta_1 = \Delta\theta \times d_1 \\ \Delta\theta_2 = \Delta\theta \times d_2 \\ \Delta\theta_0 = \Delta\theta \times d_0, \end{cases}$$

wherein $\Delta\theta_1$, $\Delta\theta_2$ and $\Delta\theta_0$ represent the output angles of the three fundamental voltage vectors $\vec{V}_1$, $\vec{V}_2$ and $\vec{V}_{null}$ respectively, and $d_1$, $d_2$ and $d_o$ represent duty ratios with respect to the undergone angle $\Delta\theta$ respectively, which are derived in $$\begin{cases} d_1 = \sqrt{3}\, m\sin\left(\frac{\pi}{3}-\theta_m\right) \\ d_2 = \sqrt{3}\, m\sin(\theta_m) \\ d_0 = 1 - d_1 - d_2. \end{cases}$$

10. The system according to claim 7, wherein the microprocessor further comprises a presetting unit and a determination unit, the presetting unit is adapted to preset both the sequence in which the variation $\Delta\theta_f$ of the angle $\theta$ of the reference voltage vector is compared with the output angles of the three fundamental voltage vectors and their comparison values, and the determination unit is adapted to determine in each preset step $T_s$ whether the variation $\Delta\theta_f$ of the angle $\theta$ of the reference voltage vector is above the angle $\Delta\theta$ that the reference voltage vector has undergone, and if so, to retrieve data in a buffer area and to zero the variation $\Delta\theta_f$ of the angle $\theta$ of the reference voltage vector.

11. The system according to claim 10, wherein the microprocessor further comprises a third calculation unit adapted to calculate the variation $\Delta\theta_f$ of the angle $\theta$ of the reference voltage vector in the formula $\Delta\theta_f=\theta_f(t)-\theta_f(0)=\int_0^t 2\pi f dt$, wherein each sample at an initial moment of time is assumed as $\theta_f(0)=0$, which is discretized as $\Delta\theta_f(k)=2\pi f T_s+\Delta\theta_f(k-1)$ in each step $T_s$, wherein k represents the current moment of time, and k−1 represents the preceding moment of time.

12. The system according to claim 7, further comprising NOT gates and a driving circuit, wherein the NOT gates are adapted to generate signals opposite to the three fundamental voltage vectors output from the outputting unit, and the driving circuit is adapted to amplify the three fundamental voltage vectors.

* * * * *